United States Patent
Tanaka

(10) Patent No.: US 8,488,426 B2
(45) Date of Patent: Jul. 16, 2013

(54) DISC DEVICE

(75) Inventor: Yukinobu Tanaka, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/429,468

(22) Filed: Mar. 26, 2012

(65) Prior Publication Data

US 2012/0250481 A1    Oct. 4, 2012

(30) Foreign Application Priority Data

Mar. 30, 2011 (JP) ................. 2011-073880

(51) Int. Cl.
*G11B 7/00* (2006.01)
(52) U.S. Cl.
USPC .......................... 369/44.38; 369/94; 369/103
(58) Field of Classification Search
None
See application file for complete search history.

(56) References Cited

U.S. PATENT DOCUMENTS

2011/0134732 A1*  6/2011  Miyamoto et al. ......... 369/44.32

FOREIGN PATENT DOCUMENTS

| JP | 2003-59092 | 2/2003 |
| JP | 2008-299957 | 12/2008 |

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

Provided is an optical disc drive device which stably controls an actuator of an optical pickup, by individually controlling an optical spot when following the guide track and an optical spot when recording/reproducing information on/from each recording layer. An optical spot when following the guide track and an optical spot when recording/reproducing information on/from each recording layer are individually controlled. At this time, the optical spot exclusive for the track and the optical spot exclusive for the recording/reproducing are formed on an optical disc.

8 Claims, 5 Drawing Sheets

DISC DEVICE

INCORPORATION BY REFERENCE

This application relates to and claims priority from Japanese Patent Application No. 2011-073880 filed on Mar. 30, 2011, the entire disclosure of which is incorporated herein by reference.

BACKGROUND OF THE INVENTION (1) Field of the Invention

The present invention relates to an optical disc or optical disc device that can record and/or reproduce information for a recording layer without track grooves in the optical disc.

(2) Description of the Related Art

Japanese Patent Application Laid-Open No. 2003-59092 (hereinafter referred to as Patent Document 1) discloses an optical disc device that can record and/or reproduce information for a recording layer without track grooves in the optical disc.

Japanese Patent Application Laid-Open No. 2008-299957 (hereinafter referred to as Patent Document 2) discloses a technique for maintaining high recording performance for the entire areas of the optical disc.

SUMMARY OF THE INVENTION

In the technique disclosed in Patent Document 1, information data is recorded or reproduced on or from each recording layer with high accuracy along the guide track formed in advance on the guide track layer of the optical disc. However, in Patent Document 1, no consideration is made to a technique for controlling optical spots suitable for two laser beams making the maximum amplitude of, for example, a focus error signal or a tracking error signal.

As disclosed in Patent Document 2, the recording and reproducing of Servo control signal is realized with the same laser beam for the recording layer as that of contents information signal in conventional optical disc devices, such as DVD, CD, and the like.

An object of the present invention is to provide a disc device that can stably realize individual controlling of an optical spot for following the guide track and an optical spot for recording/reproducing information on/from each recording layer.

The above problem can be overcome according to the claimed inventions, by way of example.

According to the present invention, there is provided a disc device that can stably control the actuator of an optical pickup.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Descriptions will now be made to an example of an optical disc device according to embodiments of the present invention. Configurations to be described now are examples only, and the present invention is not limited to the embodiments.

Embodiment 1

Figure 1:
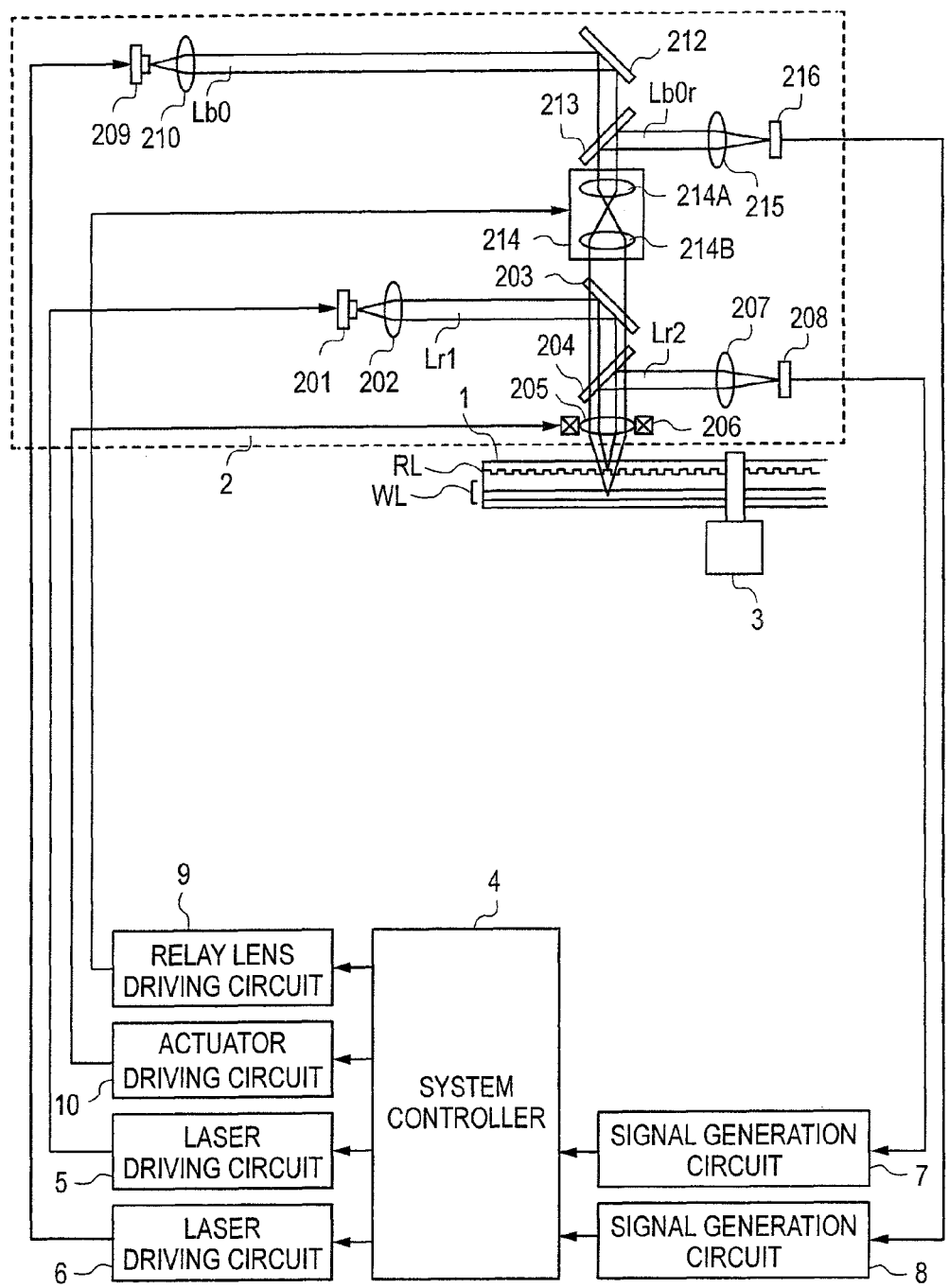
FIG. 1 is a block diagram showing a configuration of an optical disc device according to an embodiment 1.

FIG. 1 shows a block diagram of an optical disc device according to embodiment 1. An embodiment of the present invention will be described with reference to FIG. 1.

FIG. 1 is a block diagram showing a configuration of an optical disc device according to the embodiment 1. In an optical pickup 2, a laser light source 201 for servo is a semiconductor laser light source that emits red optical beams, for example, with a wavelength approximately 650 nm. In addition, the optical pickup 2 emits a predetermined amount of red optical beams Lr1 under the control of a laser driving circuit 5, onto a collimator lens 202. The collimator lens 202 converts the red optical beam Lr1 from diverging light to parallel light. Then, the converted light reaches a beam splitter 203. The beam splitter 203 has a wavelength selection property (dichroic property), showing different reflectance values depending on the wavelength of the optical beam. The splitter 203 reflects approximately 100% of the optical beam with a wavelength approximately 650 nm, and also transmits approximately 100% of the optical beam with a wavelength approximately 405 nm. Thus, the splitter 203 reflects approximately 100% of the red optical beam Lr1 with a wavelength approximately 650 nm toward a next beam splitter 204. The red optical beam Lr1 transmitted through the beam splitter 204 reaches an object lens 205. The object lens 205 condenses the red optical beam Lr1, and irradiates the beam onto the tracking guide layer RL of the optical disc 1. At this time, the red optical beam Lr1 is reflected on the tracking guide layer RL of the optical disc 1, and will be a red reflected beam Lr2 toward an opposite direction of the red optical beam Lr1.

The red reflected beam Lr2 is converted into parallel light by the object lens 205, and the converted light reaches the beam splitter 204. At this time, the red reflected beam Lr2 is reflected by the beam splitter 204 and reaches a condensing lens 207. The condensing lens 207 converges the red optical beam Lr2, and irradiates the beam onto a photo detector 208. A signal generation circuit 7 generates signals, and outputs the generated signals to a system controller 4. Specifically, the signals to be generated by the circuit 7 are: a signal for servo control of a focus error signal and a tracking error signal output from the photo detector 208; a rotation synchronization signal for controlling the rotation of the optical disc 1 and a signal for reproducing an address of the track, from the wobbled track formed on the tracking guide layer RL; and a signal for reproducing information peculiar to a disc, such as the intensity of the optical beam for recording on the recording layer WL, or information for managing user data recorded on the recording layer WL. The system controller 4 outputs a focus control signal and a tracking control signal to the actuator driving circuit 10, based on the focus error signal and the tracking error signal from the signal generation circuit 7. The object lens 205 is configured to cooperate with an actuator 206. The actuator 206 is driven into the focus direction and the tracking direction, in accordance with an output of the actuator driving circuit 10. As a result, the servo control is realized in a state where the red optical beam Lr1 follows the track while focusing on the tracking guide layer RL as a red optical focus Fr1.

Figure 2:
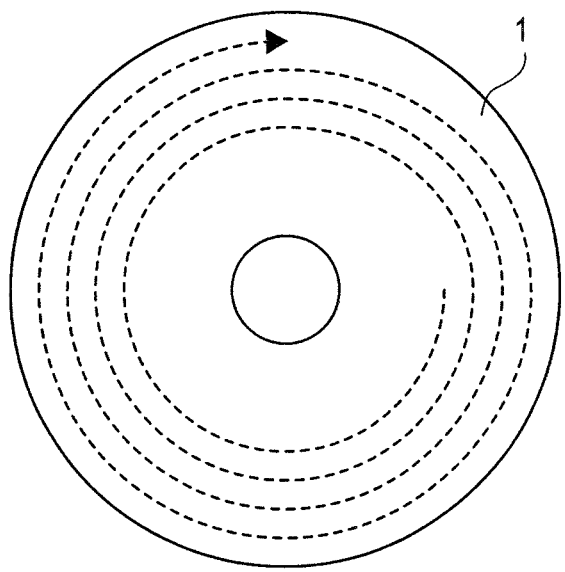
FIG. 2 is an exemplary diagram showing a spiral direction of a tracking guide layer RL of an optical disc 1.

The track formed in the tracking guide layer RL of the optical disc 1 is made in a spiral form as shown in FIG. 2. The tracking control is done in such a manner that the red optical beam Lr1 follows the track of the tracking guide layer, thereby enabling to perform the recording or reproducing continuously from the inner periphery to the outer periphery of the disc 1.

Accordingly, in the servo optical system of the optical pickup 2, the red optical beam Lr1 is irradiated onto the tracking guide layer RL of the optical disc 1. Based on a received result of the red optical beam Lr1 as a reflected light of the red optical beam, the focus control and the tracking control of the object lens 205 are achieved under the control of the system controller 4. In addition, the red optical beam Lr1 can be controlled to follow the track of the tracking guide layer RL.

In the information optical system, a laser light source 209 for recording and reproducing data is a semiconductor laser light source for emitting, for example, blue laser light with a wavelength approximately 405 nm. The laser light source 209 emits a predetermined amount of blue optical beam Lb0 under the control of a laser driving circuit 6 to a collimator lens 210. The collimator lens 210 converts the blue optical beam Lb0 from diverging light to parallel light. This light is reflected by a mirror 212, and reaches a beam splitter 213. The beam splitter 213 transmits a predetermined percentage of the blue optical beam Lb0, and the beam reaches a relay lens 214. The relay lens 214 converts the blue optical beam Lb0 from parallel light to converged light or diverging light with a movable lens 214A, and changes the convergent state of the corresponding blue optical beam Lb0 with a fixed lens 214B. Then, the beam reaches the beam splitter 203.

The movable lens 214A is set to be moved in an optical axis direction of the blue optical beam Lb0 by a non-illustrated actuator. The movable lens 214A is moved based on an output of a relay lens driving circuit 9, thereby changing the convergent state of the blue optical beam Lb0 emitted from the fixed lens 214B.

The beam splitter 203 transmits the blue optical beam Lb0 in accordance with its wavelength. Then, the beam reaches the beam splitter 204. The beam splitter 204 transmits a predetermined percentage of the blue optical beam Lb0. The beam Lb0 reaches the object lens 205. The object lens 205 condenses the blue optical beam Lb0, transmits the tracking guide layer RL of the optical disc 1, and focuses the beam in the recording layer WL. The position of a blue light focus Fb1 of the blue optical beam Lb0 is fixed based on the convergent state in which it is emitted from the fixed lens 214B of the relay lens 214. That is, the blue optical focus Fb1 is moved in a focus direction in the recording layer WL, in accordance with the position of the movable lens 214A. As a result, the blue optical beam Lb0 is irradiated from the tracking guide layer RL of the optical disc 1 to set the focus Fb1 into the recording layer WL. Further, the depth Rd from the tracking guide layer RL of the corresponding focus Fb1 is to be adjusted in accordance with the position of the movable lens 214 in the relay lens 214. The moving distance of the movable lens 214A is designed to be in proportion to the moving distance of the blue optical focus Fb1 of the blue optical beam Lb1. For example, if the movable lens 214 is moved by 1 mm, the blue optical focus Fb of the blue optical beam Lb0 is moved by 30 μm.

The beam splitter 213 receives reflected light Lb0r of the blue optical beam Lb0, thereby enabling to record and reproduce an arbitrary layer. The light is converged by a converging lens 215, and irradiated onto a photo detector 216. The photo detector 216 outputs a detected signal corresponding to an amount of detected light, to the signal generation circuit 8.

The signal generation circuit 8 generates a focus error signal representing an amount of deviation in a focus direction of the focus Fb1 of the blue optical beam Lb0, and outputs the generated signal to the system controller 4.

Figure 3:
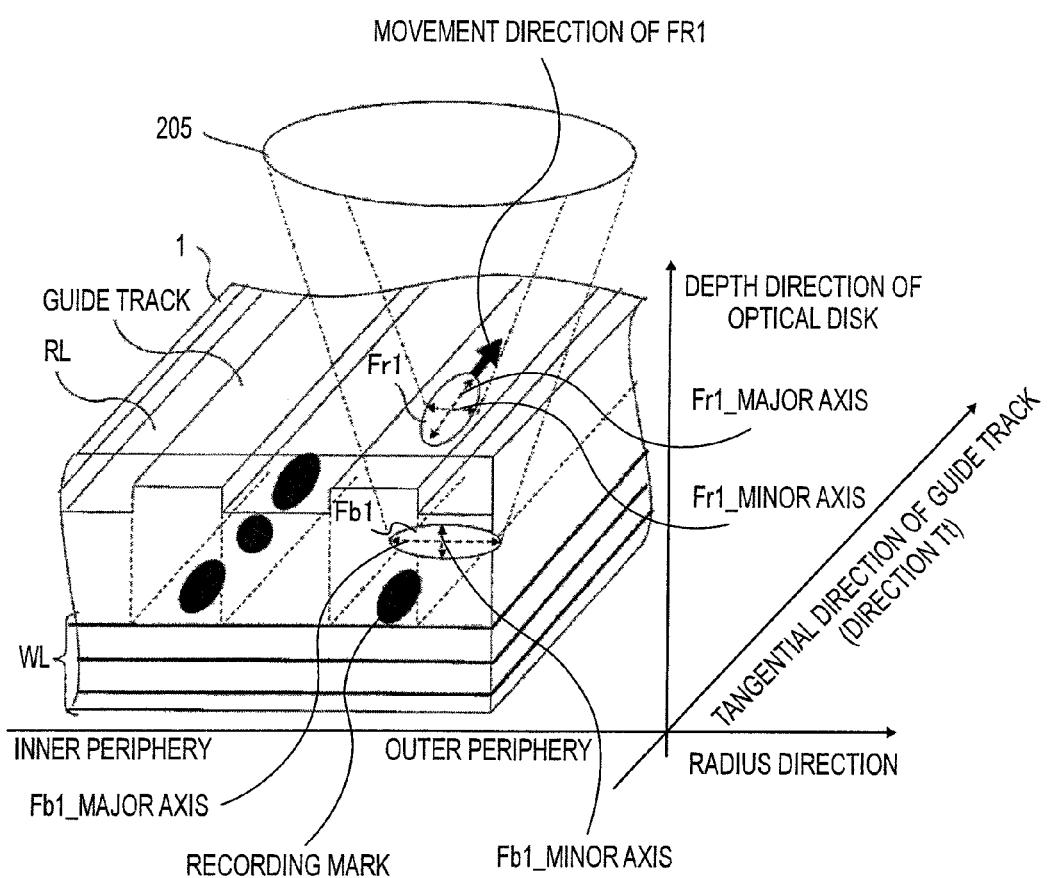
FIG. 3 is an image diagram of optical spots on the tracking guide layer RL and a recording layer WL, of the embodiment 1.

The system controller 4 outputs a focus control signal based on the focus error signal from the signal generation circuit 8 to the relay lens driving circuit 9. The actuator 214 is driven in a focus direction in accordance with the output of the relay lens driving circuit 9, thereby performing the servo control in such a manner that the focus Fb1 of the blue optical beam Lb0 follows the recording layer WL. Further, the depth from the tracking guide layer RL of the corresponding focus Fb1 is to be adjusted in accordance with the position of the movable lens 214A of the relay lens 214. As a result, as shown in FIG. 3, the blue optical beam Lb0 is positioned in a focus position of the recording layer WL having a constant depth Rd(n) corresponding to "n" layer(s) from the tracking guide layer RL, thereby enabling to perform the recording/reproducing.

The recording layer WL is a recording layer that records information thereon, upon irradiation of laser light of 405 nm onto the recording layer WL so as to optically change its form. When recording information on the recording layer WL, the blue optical beam Lb0 with relatively high intensity is irradiated thereonto, thereby forming a recording mark in the focus Fb1 of the recording layer WL.

Thus formed recording marks are arranged in a plane-like form nearly parallel to a servo layer RL of the optical disc 1. A plurality of recording layers can possibly be formed, by changing the depth Rd from the tracking guide layer RL of the focus Fb1, in accordance with the position of the movable lens 214A of the relay lens 214.

When reproducing information from the recording layer WL, the blue optical beam Lb0 is so set to be constant with low intensity that does not optically change the form of the recording layer WL, the depth Rd from the tracking guide layer RL of the corresponding focus Fb1 is changed in accordance with the position of the movable lens 214A of the relay lens 214, the focus is made into an arbitrary layer of the recording layer WL, and its reflected light Lb0r is received by the photo detector 216, thereby enabling to reproduce the arbitrary layer.

In the optical disc device having the semiconductor lasers with different wavelengths from each other (the laser light source 201 for servo and the laser light source 209 for recording/reproducing data like FIG. 1), some control is possible unlike the conventional system that performs the focus control and the track control in one spot, like the optical disc device, such as the BD, DVD, CD, and the like. That is, if the installation angle of, for example, the laser light source 201 and the laser light source 209 is changed, the optical spot angles of the red light focus Fr1 and the blue light focus Fb1 can independently be controlled in relation to the tangential direction (hereinafter referred to as a direction "Tt") of the guide track (see FIG. 3) of the tracking guide layer RL. Thus, for example, as shown in FIG. 3, the track control is realized with the laser light source 201 installed at such an angle that the major axis of the optical spot of the red optical focus Fr1 is parallel to the tangential direction "Tt" (Fr1_major axis// direction "Tt") of the guide track, in relation to the major axis and minor axis of the red optical focus Fr1. This can enhance the push-pull amplitude in the push-pull system. The focus control is realized with the laser light source 209 installed at such an angle that the major axis of the optical spot of the blue optical focus Fb1 is vertical to the tangential direction "Tt" (Fb1_major axis☐direction Tt) of the guide track, in relation to the major axis and minor axis of the blue optical focus Fb1, as shown in FIG. 3. This can enhance the resolution for forming the recording/reproducing mark, when recording/reproducing data, and also results in recording/reproducing information data with high accuracy.

In this embodiment, the red optical focus Fr1_major axis// direction "Tt" is set by way of example, along the blue optical focus Fb1_major axis direction "Tt". Thus, "Fb1_major axis" is at an angle of 90° with respect to "Tt", while "Fr1_major axis" is at an angle of 0° with respect to "Tt". These angles are not necessarily 90° and 0°, as long as the maximum push-pull signal is attained, for example, in the push-pull system, or as long as the high resolution of the recording mark is attained in the case of recording. In the above description, the angel of the focus major axis has been changed in accordance with the installation angles of the laser light source 201 and the laser light source 209. However, the angles may optically be changed, instead.

Embodiment 2

Figure 4:
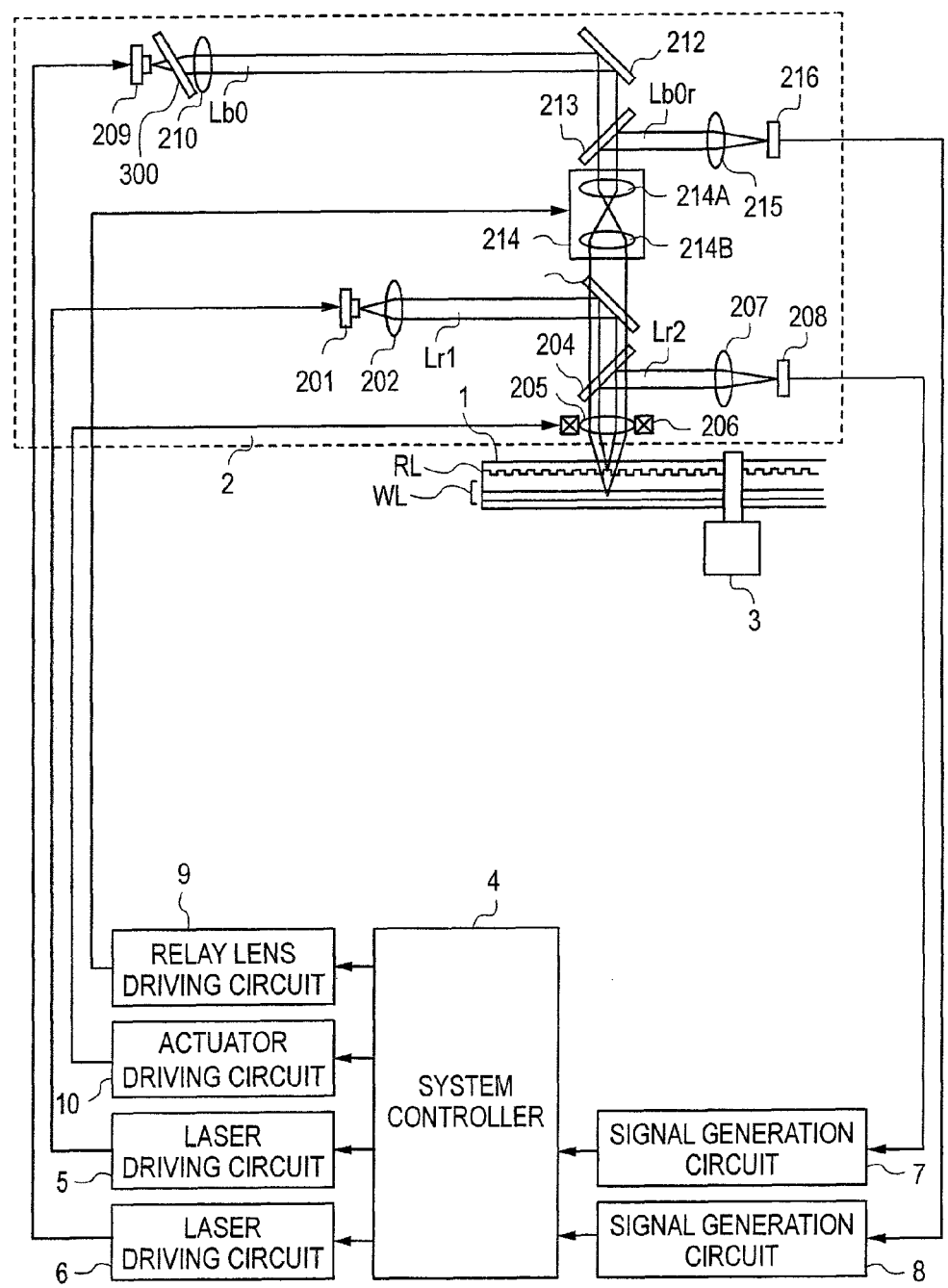
FIG. 4 is a block diagram showing a configuration of an optical disc device according to embodiment 2.
Figure 5:
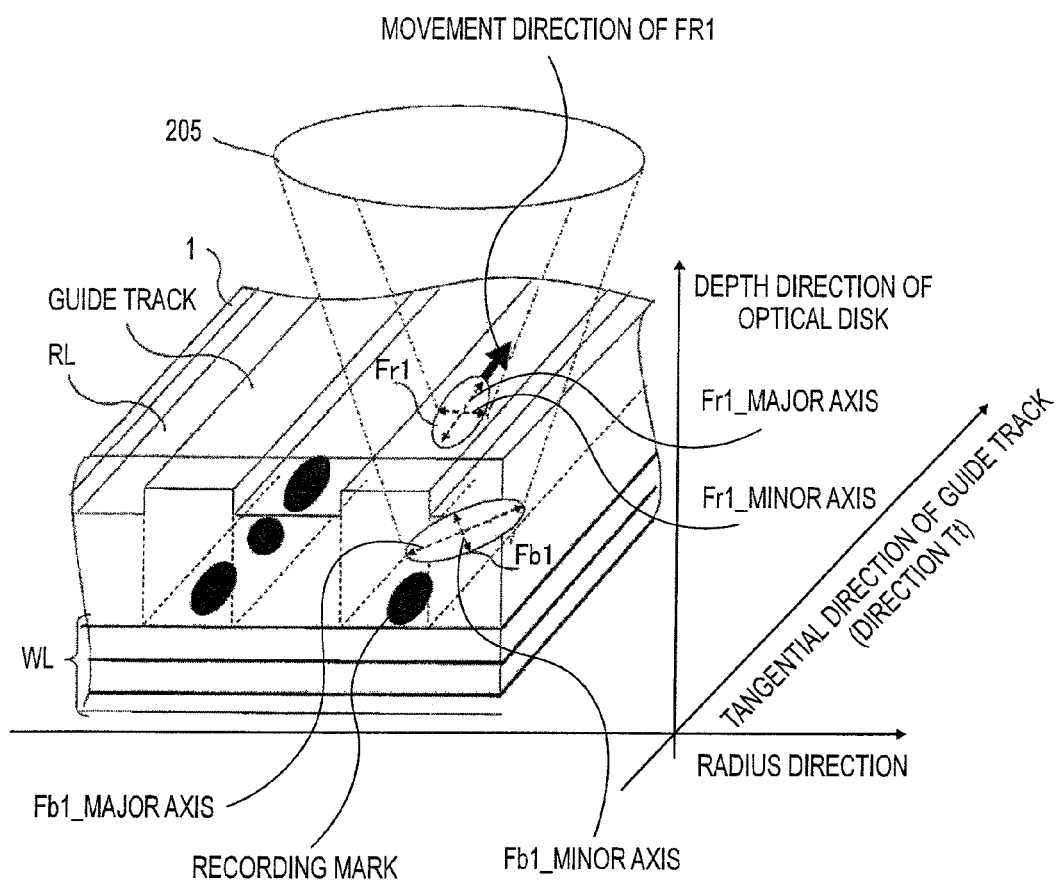
FIG. 5 is an image diagram showing optical spots on a tracking guide layer RL and a recording layer WL according to the embodiment 2.

FIG. 4 is a block diagram showing a configuration of an optical disc device according to embodiment 2. In this embodiment, a parallel plate 300 is inclined at a predetermined angle with respect to the optical beam emitted from the laser light source 209. Other configurations of FIG. 4 are the same as those of the embodiment 1, and thus will now be described again. In this embodiment, astigmatism correction is achieved only for the optical beam Lb0 of the laser light source 209 using the parallel plate 300. As a result, the ellipticity (ellipticity=Fb1_minor axis/Fb1_major axis) is set closer to 1, so as to make the ellipse have more rounded shape. Note that the ellipticity is a value as a ratio of Fb1_major axis and Fb1_minor axis of the optical spot Fb1. For example, as shown in FIG. 5, when recording/reproducing information, the ellipticity of the laser light is set closer to 1 in a manner that the optical spot Fb1 is not affected by a neighbor recording mark and does not write over or delete the neighbor recording mark. That is, the optical spot Fb1 (with the ellipticity suitable for recording/reproducing and hardly affected by the neighbor) is formed in the recording layer WL, thereby enabling to realize the focus control.

In this embodiment, astigmatism correction is performed only for the optical spot of the laser light source 209. However, this correction may be applied to the laser light source 201, and may be applied to both lasers. It is not limited that the astigmatism correction is performed using the parallel plate 3, and may be achieved using a cylindrical lens inserted in the device.

Embodiment 3

In embodiment 3, in the configuration of the optical disc device according to the embodiment 2 of FIG. 4, the astigmatism correction is so performed as to set the ellipticity of the optical spot Fb1 closer to 1 for more rounded shape, and the Fb1_major axis is inclined at 55° with respect to the direction "Tt" as described in the embodiment 1. As a result, it is possible to reduce the percentage in which the light of the optical spot Fb1_major axis is irradiated onto the neighbor recording mark. For example, the ellipticity can be set closer to 0.8 in order that the optical spot Fb1 of the laser light source 209 for reproducing data is unlikely to be affected by the neighbor recording mark. If the optical spot is likely to be affected by the neighbor recording mark, the installation angle of the laser light source 209 is changed so as to change the angle of the optical spot Fb1, and the optical spot Fb1 (with the ellipticity suitable for the reproducing mark and hardly affected by the neighbor) is formed in the recording film WL, thereby enabling to realize the focus control. As a result, information data can be reproduced with high accuracy.

Accordingly, the preferred embodiments of the present invention have been described. However, the present invention is not limited to the above embodiments, and various changes may be made thereto. For example, the above-described embodiments have specifically been described for clearly describing the present invention, and do not necessarily include the above-described entire constituents. A part of the configuration of one embodiment may be replaced with another embodiment. In addition, a configuration of one embodiment may be added to the configuration of another embodiment. In the present invention, the descriptions have been made to the angle of Fr1_major axis at which the maximum amplitude is attained in the push-pull system. However, it is possible to apply other angles and ellipticity of Fr1_major axis that differ from those of the push-pull system, when generating a tracking error signal in accordance with a phase difference method, a 3 beam method, or a differential push-pull method. The direction and ellipticity of Fb1_major axis that are suitable for the recording and reproducing may be applied, when generating a focus error signal in accordance with a spot size method, a knife edge method, or the like. The spiral direction of the track of FIG. 2 is toward the outer peripheral direction. However, the spiral direction may be toward inner peripheral direction.

In the preferred embodiments of the present invention described above, a term "recording layer" is used. However, the existence of the "layer" is not always necessary. For example, the present invention may be applicable to a third-dimensional recording layer. The third-dimensional recording layer is called "layer", but it has no layer, and the information signals are volume-recorded in it.

While we have shown and described several embodiments in accordance with our invention, it should be understood that disclosed embodiments are susceptible of changes and modifications without departing from the scope of the invention. Therefore, we do not intend to be bound by the details shown in described herein but intend to cover all such changes and modifications that fall within the ambit of the appended claims.

What is claimed is:

1. A disc device for recording or reproducing information data on or from an optical recording medium, the optical recording medium including a tracking guide layer in which a guide track for tracking is formed and at least two recording layers in which information data is recorded, the device comprising:

a first light source configured to generate a first laser light for reproducing or recording the information data on or from the recording layer, and positioned such that the first laser light forms a first ellipse-shaped spot on the recording layer, with the first ellipse-shaped spot having a major axis; and a second light source configured to generate a second laser light for reading the guide track from the tracking guide layer, and positioned such that the second laser light forms a second ellipse-shaped spot on the tracking layer, with the second ellipse-shaped spot having a major axis, and a direction of the major axis of the first ellipse-shaped spot differing from a direction of the major axis of the second ellipse-shaped spot, so that an amplitude of a push-pull signal in a push-pull system is increased.

2. A disc device for recording or reproducing information data on or from an optical recording medium, the optical recording medium including a tracking guide layer and at least two recording layers in which information data is recorded, the device comprising:
  a first light source configured to generate a first laser light for recording or reproducing the information data on or from the recording layer, and positioned such that the first laser light forms a first ellipse-shaped spot on the recording layer, with the first ellipse-shaped spot having a major axis; and
  a second light source configured to generate a second laser light for reading the guide track from the tracking guide layer, and positioned such that the second laser light forms a second ellipse-shaped spot on the tracking guide layer, with the second ellipse-shaped spot having a major axis, and an angle of the major axis of the first ellipse-shaped spot, in relation to a tracking guide, differing from an angle of the major axis of the second ellipse-shaped spot, also in relation to the tracking guide, so that an amplitude of a push-pull signal in a push-pull system is increased.

3. A disc device for recording or reproducing information data on or from an optical recording medium, the optical recording medium including a tracking guide layer in which a guide track for tracking is formed in advance and a 3-dimensional optical recording layer in which information data is holographically recorded, the disc device comprising:
  a first light source configured to generate a first laser light for reproducing or recording the information data on or from the recording layer, and positioned such that the first laser light forms a first ellipse-shaped spot in the 3-dimensional recording layer, with the first ellipse-shaped spot having a major axis; and
  a second light source configured to generate a second laser light for reading the guide track from the tracking guide layer, and positioned such that the second laser light forms a second ellipse-shaped spot on the tracking guide layer, with the second ellipse-shaped spot having a major axis, and a direction of the major axis of the first ellipse-shaped spot differing from a direction of the major axis of the second ellipse-shaped spot, so that an amplitude of a push-pull signal in a push-pull system is increased.

4. A disc device for recording or reproducing information data on or from an optical recording medium, the optical recording medium including a tracking guide layer in which a guide track for tracking is formed in advance and a 3-dimensional recording layer in which information data is holographically recorded, the disc device comprising:
  a first light source configured to generate a first laser light for reproducing or recording the information data from or on the recording layer, and positioned such that the first laser light forms a first ellipse-shaped spot in the 3-dimensional recording layer, with the first ellipse-shaped spot having a major axis; and
  a second light source configured to generate a second laser light for reading the guide track from the tracking guide layer, and positioned such that the second laser light forms a second ellipse-shaped spot on the tracking guide layer, with the second ellipse-shaped spot having a major axis, and an angle of the major axis of the first ellipse-shaped spot, in relation to a tracking guide, differing from an angle of the major axis of the second ellipse-shaped spot, also in relation to the tracking guide, so that an amplitude of a push-pull signal in a push-pull system is increased.

5. The disc device of claim 1, further comprising:
  a lens, disposed between the optical recording medium and at least one of the first light source and the second light source, and configured to condense the respective ones of at least one of the first laser light and the second laser light.

6. The disc device of claim 2, further comprising:
  a lens, disposed between the optical recording medium and at least one of the first light source and the second light source, and configured to condense the respective ones of at least one of the first laser light and the second laser light.

7. The disc device of claim 3, further comprising:
  a lens, disposed between the optical recording medium and at least one of the first light source and the second light source, and configured to condense the respective ones of at least one of the first laser light and the second laser light.

8. The disc device of claim 4, further comprising:
  a lens, disposed between the optical recording medium and at least one of the first light source and the second light source, and configured to condense the respective ones of at least one of the first laser light and the second laser light.

* * * * *